(12) United States Patent
Kataoka et al.

(10) Patent No.: US 6,266,111 B1
(45) Date of Patent: *Jul. 24, 2001

(54) DIFFUSE REFLECTION PLATE, MANUFACTURING METHOD THEREOF, AND REFLECTION-TYPE DISPLAY DEVICE

(75) Inventors: Hideo Kataoka; Takayuki Fujioka; Tetsuo Urabe, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,032

(22) Filed: Mar. 2, 1999

(30) Foreign Application Priority Data

Mar. 10, 1998 (JP) .................................. 10-076699

(51) Int. Cl.⁷ .................................................. G02F 1/1335
(52) U.S. Cl. ............................................................. 349/113
(58) Field of Search ..................................... 349/113, 187

(56) References Cited

U.S. PATENT DOCUMENTS 4,519,678 * 5/1985 Komatsubara et al. ............. 349/113
5,805,252 * 9/1998 Shimada et al. ..................... 349/113
5,847,789 * 12/1998 Nakamura et al. .................. 349/113

FOREIGN PATENT DOCUMENTS 0 495 679 * 7/1992 (EP) ..................................... 349/113
0 557 110 * 8/1993 (EP) ..................................... 349/113
6-11711 * 1/1994 (JP) ..................................... 349/113

* cited by examiner

Primary Examiner—Walter J. Malinowski
(74) Attorney, Agent, or Firm—Ronald P. Kananen; Rader, Fishman & Grauer

(57) ABSTRACT

First, a photosensitive resin film is formed on a substrate. Then, the resin film is patterned by photolithography into a collection of quadrilateral prisms that are arranged discretely. Then, the individual quadrilateral prisms are deformed so as to be undulated gently by performing a heat treatment. Thereafter, a resin film is applied to the collection of deformed quadrilateral prisms, whereby flat gap portions between the discrete quadrilateral prisms are filled in and curved surfaces are formed there. Finally, a metal film is formed on the collection of gently undulated quadrilateral prisms.

12 Claims, 4 Drawing Sheets

DIFFUSE REFLECTION PLATE, MANUFACTURING METHOD THEREOF, AND REFLECTION-TYPE DISPLAY DEVICE

BACKGROUND OF THE INVENTION

1. Field of the Invention

The present invention relates to a diffuse reflection plate to be used in a reflection-type display device and a manufacturing method thereof as well as to a reflection-type display device using a diffuse reflection plate.

2. Description of the Related Art

Having a flat panel shape, display devices using a liquid crystal or the like as an electro-optical layer have features that they are light, thin, and of low power consumption. For this reason, such display devices are being developed enthusiastically as displays of portable equipment, for example. Electro-optical materials such as a liquid crystal are not of a spontaneous light emission type and produce an image by selectively transmitting and interrupting external light. Passive display devices of this type are classified into the transmission type and the reflection type by the illumination method.

In a transmission-type display device, a panel in which an electro-optical layer such as a liquid crystal layer is held between two transparent substrates is manufactured and a light source (backlight) for illumination is disposed on the back side of the panel. An image is observed from the front side of the panel. In the case of the transmission type, the backlight is indispensable and a cold-cathode tube or the like is used as a light source. Since the backlight consumes most of the energy that is consumed by the entire display, transmission-type devices are not suitable for a display of portable equipment. On the other hand, in the case of the reflection type, a reflection plate is disposed on the back side of a panel and external light such as natural light is input from the front side. An image is observed from the front side as in the case of the transmission type by utilizing reflection light of the input external light. Not using a light source for back illumination unlike transmission-type devices, reflection-type devices are of relatively low power consumption and hence suitable for a display of portable equipment.

In reflection-type display devices, because display is performed by utilizing incident light coming from the environment, it is necessary to increase the luminance by effectively utilizing the incident light. Further, to realize white display (what is called paper white), basically it is necessary to diffuse-reflect incident light within the panel. To this end, conventional reflection-type display devices incorporate a diffuse reflection layer within the panel. It is intended that the diffuse reflection layer have a characteristic that is close to perfect diffusion and assume an appearance that as close to paper white as possible.

However, display devices have a mode in which an image is produced by utilizing a linearly polarized component of incident light. In this mode, there may occur a case that when a diffuse reflection plate having a perfect diffusion characteristic is used, sufficiently high contrast cannot be obtained because the polarization state of incident light is disordered.

Where a reflection-type display device is illuminated in a room by using an auxiliary light source such as a desk lamp, causing incident light from the light source to be reflected efficiently toward a viewer is effective for increase in luminance. However, conventional diffuse reflection layers having perfect diffusion do not have what is called directivity and hence cannot make effective use of incident light when combined with an auxiliary light source or the like.

SUMMARY OF THE INVENTION

The present invention has been made to solve the above-described problems in the art, and an object of the invention is therefore to increase the luminance of a reflection-type display device.

A more specific object of the invention is to provide a manufacturing method of a diffuse reflection plate having high diffusion efficiency and desired directivity.

To attain the above objects, according to the invention, a diffuse reflection plate is manufactured by the following process. First, a photosensitive resin film is formed on a substrate. Then, the resin film is patterned by photolithography into a collection of quadrilateral prisms that are arranged discretely. Then, the individual quadrilateral prisms are deformed so as to be undulated gently by performing a heat treatment. Finally, a metal film is formed on the collection of gently undulated quadrilateral prisms. Preferably, a resin film is applied to the collection of gently undulated quadrilateral prisms, whereby flat gap portions between the discrete quadrilateral prisms are filled in and curved surfaces are formed there. A diffuse reflection plate manufactured in the above manner is configured in such a manner that a resin film formed with asperities and a metal film are formed on a substrate.

A diffuse reflection plate manufactured by the above method and having the above structure can be incorporated in a reflection-type display device. In this case, the reflection-type display device comprises, as a basic configuration, a transparent first substrate disposed on the incidence side; a second substrate disposed on the reflection side and bonded to the first substrate via a predetermined gap; an electro-optical layer disposed in the gap on the side of the first substrate; a diffuse reflection layer disposed in the gap on the side of the second substrate; and an electrode formed on at least one of the first and second substrates, for applying a voltage to the electro-optical layer. The diffuse reflection film is composed of a resin film formed with asperities and a metal film formed on the surface of the resin film. An important feature is that the asperities have been gently undulated by patterning a resin film into discrete quadrilateral prisms so as to leave gaps in between and then causing the quadrilateral prisms to reflow. Preferably, the asperities have been gently undulated by filling in gaps remaining after reflow of the quadrilateral prisms with another resin film. Preferably, the asperities have an inclination angle of about 10° to about 20°. Also preferably, the individual quadrilateral prisms have been patterned so that their edges are arranged in a fixed direction.

According to a preferred embodiment of the invention, a polarizing plate is disposed on the side of the first substrate, and the electro-optical layer is a liquid crystal layer that functions as a quarter-wave plate depending on a voltage application state. In this case, a quarter-wave plate is disposed between the polarizing plate and the liquid crystal layer, and the liquid crystal layer is a nematic liquid crystal having positive dielectric anisotropy and aligned in a twisted manner, and functions as a quarter-wave plate when supplied with a voltage and loses the function of a quarter-wave plate when not supplied with a voltage.

In the manufacturing method of a diffuse reflection plate according to the invention, asperities having a diffusive property are formed by causing discrete quadrilateral prisms made of a resin to reflow. It is conceivable to use cylindrical patterns instead of the quadrilateral prisms. However, a diffuse reflection plate manufactured according to the invention is superior in light diffusing power because quadrilateral prisms can be patterned at a higher density than cylinders. Since the gaps between the individual discrete quadrilateral prisms have a smaller area than the gaps between the individual discrete cylinders, the asperities having diffusing power can be arranged at a higher density accordingly. When the quadrilateral prisms made of a resin are caused to reflow by a heat treatment, the edge portions of each quadrilateral prism are deformed so as to be curved gently, to thereby provide desired light diffusing power. By arranging edges of the individual quadrilateral prisms in a fixed direction, desired directivity can be given to the diffuse reflection plate. This effect is made more remarkable by an additional measure of making the cross-section of each quadrilateral prism rectangular. In contrast, where cylinders made of a resin are caused to reflow, they are shaped into bowl-like protrusions and hence no directivity is obtained.

DETAILED DESCRIPTION OF THE PREFERRED EMBODIMENTS

Embodiments of the present invention will be hereinafter described in detail with reference to the accompanying drawings.

FIGS. 1A–1E are process diagrams showing a manufacturing method of a diffuse reflection plate according to the invention. First, in a step shown in FIG. 1A, a substrate 2 made of glass, for example, is prepared. Then, in a step shown in FIG. 1B, a photosensitive resin film 11 made of a photoresist, for example, is formed on the substrate 2. Then, in a step shown in FIG. 1C, the resin film 11 is patterned by photolithography into a collection of quadrilateral prisms that are arranged discretely.

Figure 1A:
FIGS. 1A–1E are process diagrams showing a manufacturing method of a diffuse reflection plate according to the present invention.
Figure 1B:
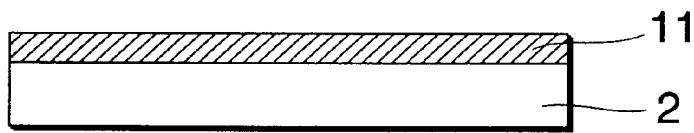
Figure 1C:
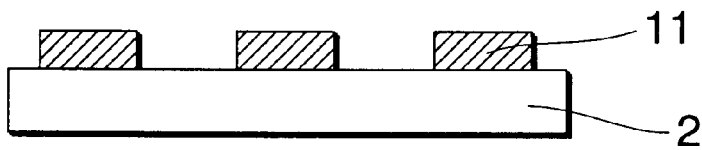
Figure 1D:
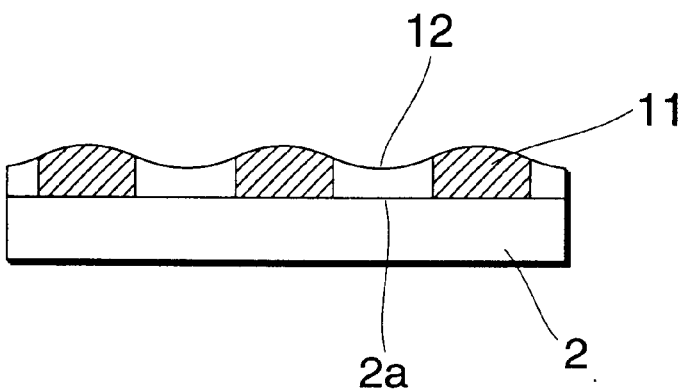

Then, in a step shown in FIG. 1D, a heat treatment (reflow) is performed to deform the individual quadrilateral prisms so that they will be gently undulated. In this reflow step, the resin film 11 is heated to a temperature higher than its softening point or melting point, whereby the resin film 11, that is, the quadrilateral prisms, is temporarily melted and deformed so as to be gently undulated by the action of surface tension. In particular, the four edges of the top surface of each quadrilateral prism are gently curved (i.e., rounded) and desired slant surfaces are thereby obtained. Further, the collection of quadrilateral prisms thus deformed (gently undulated) is coated with another resin film 12 made of a photoresist, for example, whereby the flat gap portions 2a between the discrete quadrilateral prisms are covered to form curved surfaces there. Since no flat portions remain on the surface of the substrate 2, there is no possibility that specular reflection occurs. By preventing specular reflection, the reflection luminance of a resulting diffuse reflection plate as viewed from the front side can be increased.

Figure 1E:
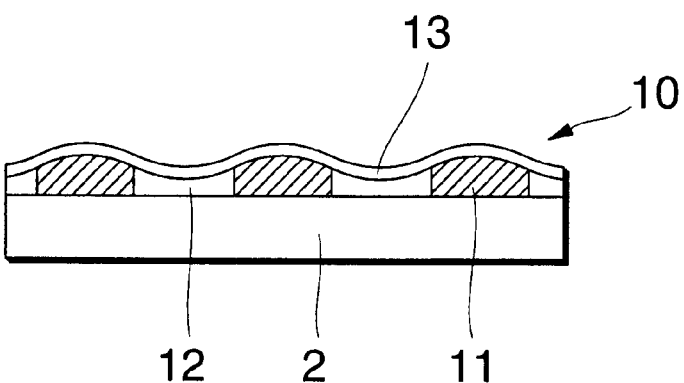

Finally, in a step shown in FIG. 1E, a metal film 13 is formed on the collection of deformed (gently undulated) quadrilateral prisms. As a result, a diffuse reflection layer 10 is obtained that is composed of the resin film 11 and the metal film 13 laid thereon. A resulting diffuse reflection plate has a structure that the diffuse reflection layer 10 is formed on the substrate 2. For example, the metal film 13 is formed by depositing a metal such as aluminum or silver on the substrate 2 by sputtering or vacuum evaporation.

Figure 2:
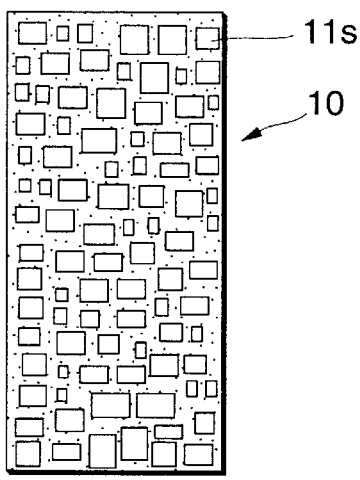
FIG. 2 is a schematic plan view showing a pattern of one-pixel portion of a diffuse reflection plate manufactured according to the invention.

FIG. 2 schematically shows a pattern of the diffuse reflection layer 10 shown in FIG. 1E. This pattern corresponds to one-pixel portion when the diffuse reflection plate is incorporated in a reflection-type display device. As is apparent from the manufacturing method of the diffuse reflection layer 10 that has been described with reference to FIGS. 1A–1E, the asperity structure for providing a light diffusion property is formed by a collection of quadrilateral prisms 11s that are made of a photoresist, for example, and have been deformed (gently undulated) by reflow. The shape of the asperity structure of the diffuse reflection layer 10 is almost determined by the shape of a patterned photosensitive resin film. In general, the luminance of a display device can be increased by increasing the density of asperities of the diffuse reflection layer 10 to thereby direct reflection light efficiently toward a viewer. In view of this, in the invention, a resin film made of a photoresist, for example, is shaped into discrete patterns, that is, quadrilateral prisms 11s, by photolithography as shown in FIG. 2. Conventionally, a photoresist is shaped into discrete cylinders. Forming quadrilateral prisms as in the invention makes it possible to shorten the intervals between adjacent patterns to thereby form a high-density asperity structure. That is, forming fine asperities that contribute to diffuse reflection in the form of quadrilateral prisms can provide a higher density than in the form of cylinders.

As shown in FIG. 2, the quadrilateral prisms 11s are patterned in such a manner that the edges of the individual quadrilateral prisms 11s are arranged in fixed directions. By causing the individual quadrilateral prisms 11s to reflow, each of their edges can be curved gently. The gentle slant surfaces substantially contribute to diffuse reflection. Therefore, with the pattern of FIG. 2, the surfaces contributing to reflection can be formed intentionally so as to extend in a desired direction, to thereby provide desired directivity. In the example of FIG. 2, there are many diffuse reflection surfaces that are parallel with the longitudinal direction of the pixel and hence light that is incident in the pixel longitudinal direction can be reflected efficiently in the pixel normal direction. By utilizing this feature, a diffuse reflection plate can be designed so as to realize bright display in an environment in which the range of direction of incident light emitted from a desk lamp or the like is determined to a certain extent. For example, as shown in FIG. 2, the individual quadrilateral prisms 11s are designed intentionally so as to have rectangular cross-sections. If the longer sides of the rectangular cross-sections are made parallel with the shorter sides of the pixel, light that is incident in the pixel shorter-side direction can be reflected efficiently in the normal direction (toward the front side).

That is, by arranging the quadrilateral prisms 11s so that their edges extend in a desired direction with respect to the pixel, an effect of intentionally intensifying a diffuse reflection light component traveling in a desired direction is obtained when parallel light is given whose incident direction range is determined to a certain extent.

Figure 3:
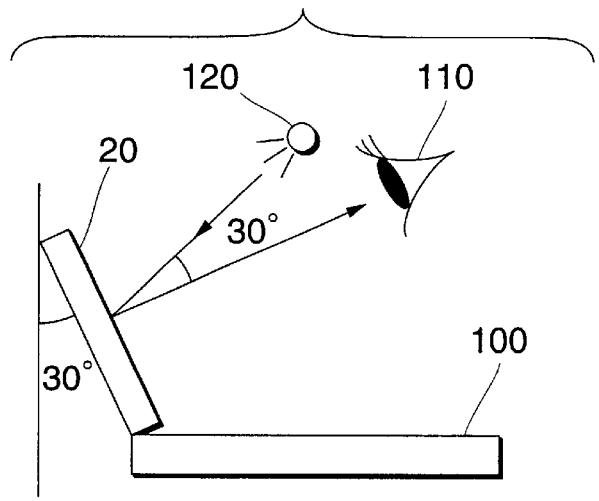
FIG. 3 is a schematic diagram showing an example of use of a reflection-type display device incorporating a diffuse reflection plate manufactured according to the invention.

FIG. 3 is a schematic diagram showing an example of use of a diffuse reflection plate manufactured according to the invention. In this example, a diffuse reflection plate is incorporated in a reflection-type panel 20, which is used as a display of a notebook-sized personal computer 100. When the notebook-sized personal computer 100 is in use, the liquid crystal panel 20 as the display is opposed to a viewer 110 while assuming a posture in which the liquid crystal panel 20 is inclined from the vertical direction by 30°, for example. An auxiliary light source 120 such as a desk lamp is disposed above the viewer 110. The eyes of the viewer 110 are located on the normal direction of the panel 20 and the auxiliary light source 120 is located on a direction that is inclined by 30° upward from the normal direction. By optimizing the process, the inclination angles of the respective edges of each quadrilateral prism 11s after being subjected to reflow can be set in consideration of the above actual use environment.

Figure 4:
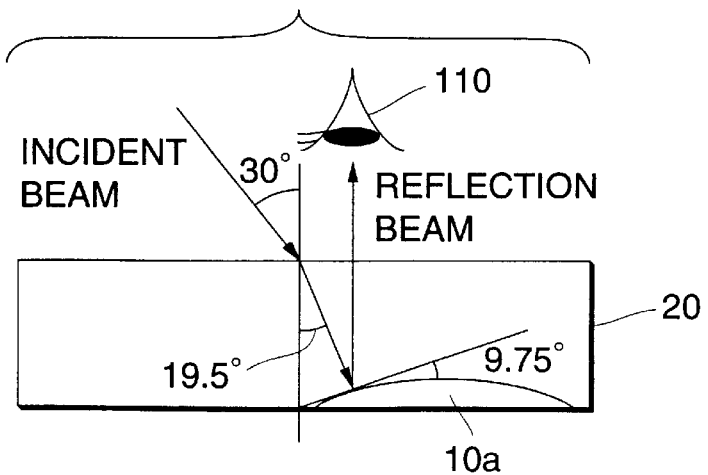
FIG. 4 is a geometry diagram showing an example of use of a reflection-type display device incorporating a diffuse reflection plate manufactured according to the invention.

Referring to FIG. 4, a description will be made of an optimum inclination angle range of asperities 10a of a diffuse reflection layer. As seen from a geometry diagram of FIG. 4, an incident beam coming from an auxiliary light source is incident on a liquid crystal panel 20 at 30°, for example, with respect to the normal to the panel 20. The incident beam is reflected by the inclined surfaces of individual asperities 10a of the diffuse reflection layer toward the eyes of a viewer 110 that are located on the normal direction. With an assumption that the average refractive index of the panel 20 is 1.4, as seen from the geometrical relationship shown in FIG. 4, a reflection beam of the incident beam coming from the auxiliary light source 120 is directed approximately in the direction (toward the front side) on which the eyes of the viewer 110 are located by setting the inclination angles of the asperities 10a at about 10°. Since in general the incident angle of an incident beam may exceed 30°, a display that is bright when viewed at an angle of actual use can be realized by setting the inclination angles of the asperities 10a at 10°–20°.

Figure 5:
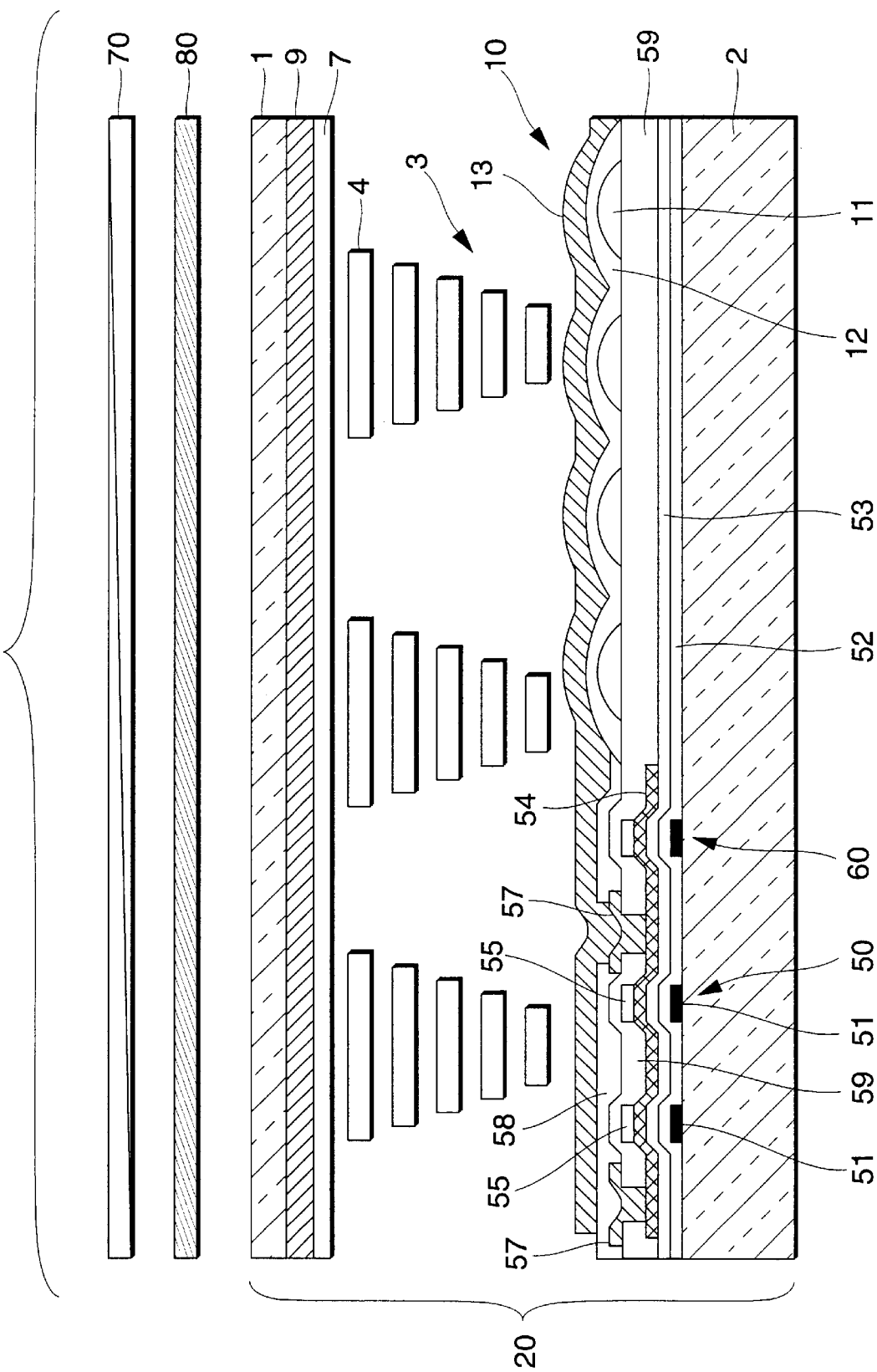
FIG. 5 is a schematic partial sectional view of an embodiment of a reflection-type display device incorporating a diffuse reflection plate manufactured according to the invention.

FIG. 5 is a schematic partial sectional view of a reflection-type display device according to an embodiment of the invention. In this embodiment, a liquid crystal panel 20 that operates in a TN-ECB (twisted nematic-electrically controlled birefringence) is used. As shown in FIG. 5, a polarizing plate 70 such as a polymer film having optical anisotropy and a quarter-wave plate 80 such as a one-axis-extended polymer film are disposed on the surface of the panel 20. The panel 20 is constructed in such a manner that a first substrate 1 that is a transparent glass plate, for example, and is disposed on the external light incidence side and a second substrate 2 that is also a glass substrate, for example, and is disposed on the reflection side are bonded together via a predetermined gap. A nematic liquid crystal layer 3 as an electro-optical layer is held in the gap between the two substrates 1 and 2. Liquid crystal molecules 4 are aligned in a twisted manner by top and bottom alignment films (not shown). An electrode made of ITO, Al, or the like is formed on the inside surface of each of the substrates 1 and 2. By using those electrodes, a voltage is applied to the nematic liquid crystal layer 3 on a pixel-by-pixel basis. The display device of this embodiment is what is called an active matrix type, and an opposed electrode 7 made of ITO, for example, is formed on the first substrate 1 side while a pixel electrode 13 made of Al, for example, is formed on the second substrate 2 side. The pixel electrode 13 is driven by a thin-film transistor 50 as a switching element. The opposed electrode 7 and the pixel electrode 13 are opposed to each other and define a pixel. According to the invention, a diffuse reflection layer 10 is formed on the inside surface of the second substrate 2. The diffuse reflection layer 10 is composed of a resin film 11 made of a photoresist, for example, and a metal film 13 made of Al, for example. In this embodiment, the metal film 13 also serves as the pixel electrode.

The reflection-type liquid crystal display device having the above configuration operates in a TN-ECB, normally-white mode. That is, when not supplied with a voltage, the nematic liquid crystal layer 3 maintains the twisted alignment and serves as a quarter-wave plate. Cooperating with the polarizing plate 70 and the quarter-wave plate 80, the nematic liquid crystal layer 3 transmits external light and effects white display. On the other hand, when supplied with a voltage, the nematic liquid crystal layer 3 makes a transition to a vertical alignment state and loses the function of a quarter-wave plate. Cooperating with the polarizing plate 70 and the quarter-wave plate 80, the nematic liquid crystal layer 3 interrupts external light and effects black display.

Each component will be described below in detail still with reference to FIG. 5. As described above, the polarizing plate 70 is disposed above the surface of the first substrate 1 of the panel 20. The quarter-wave plate 80 is interposed between the polarizing plate 70 and the first substrate 1. The quarter-wave plate 80 is a one-axis-extended polymer film, for example, and provides a phase difference of a quarter wavelength between an ordinary ray and an extraordinary ray. The optic axis (anisotropy axis (uniaxial)) of the quarter-wave plate 80 is so set as to form 45° with the polarization axis (transmission axis) of the polarizing plate 70. External light is converted to linearly polarized light when it has passed through the polarizing plate 70. The linearly polarized light is converted to circularly polarized light when it has passed through the quarter-wave plate 80. The circularly polarized light is returned to linearly polarized light if it passes through a quarter-wave plate again. In this case, the polarization direction is rotated by 90° from the original polarization direction. In this manner, the polarization direction can be rotated by combining quarter-waves plates and a polarizing plate. This principle is utilized for display. In view of this, the invention employs the diffuse reflection layer 10 that is so configured as to disorder the polarization direction by only a relatively small degree.

The panel 20 has, as the electro-optical layer, the nematic liquid crystal layer 3 made of the nematic liquid crystal molecules 4 that are basically oriented horizontally and have positive dielectric anisotropy. The nematic liquid crystal layer 3 functions as a quarter-wave plate when its thickness is set at a proper value. In this embodiment, the nematic liquid crystal layer 3 has refractive index anisotropy $\Delta n$ of about 0.7, for example, and a thickness of about 3 $\mu$m, for example. Therefore, the retardation $\Delta n \cdot d$ of the nematic liquid crystal layer 3 amounts to 0.2–0.25 $\mu$m. Since the nematic liquid crystal molecules 4 are aligned in a twisted manner as shown in FIG. 5, the retardation value is made substantially equal to about 0.15 $\mu$m (150 nm). This value is approximately ¼ of the center wavelength (about 600 nm) of external light, and hence the nematic liquid crystal layer 3 can optically function as a quarter-wave plate. By holding the nematic liquid crystal layer 3 between the top and bottom alignment films, a desired twisted alignment can be obtained. The liquid crystal molecules 4 are aligned in the rubbing direction of the alignment film on each of the first substrate 1 side and the second substrate 2 side. A desired twisted alignment can be obtained by making the rubbing directions of the top and bottom alignment films different from each other by 60°–70°, for example.

Color filters 9 made of pigment-dispersed photoresists, for example, are formed on the side of the transparent first substrate 1. On the other hand, the diffuse reflection layer 10 is formed on the reflection side, i.e., on the second substrate 2 side. The diffuse reflection layer 10 has asperities on its surface and hence has a light scattering property. Therefore, the diffuse reflection layer 10 assumes an appearance of paper white and hence is preferable as a display background. Further, since the diffuse reflection layer 10 reflects incident light in a relatively large angular range, it increases the viewing angle to provide more visible display, as well as increases the display brightness in a wide angular range for viewing.

As shown in FIG. 5, the diffuse reflection layer 10 is composed of the resin film 11 formed with asperities and the metal film 13 formed on the surface of the resin film 11. As described above, the metal film 13 also serves as the pixel electrode. The diffuse reflection layer 10 is formed according to the invention. That is, the resin film 11 is patterned into discrete quadrilateral prisms so that gaps are left in between and then caused to reflow, whereby asperities having gentle undulation are formed. Gaps that are left after the reflow of the resin film 11, that is, the quadrilateral prisms, are filled in with another resin film 12, whereby asperities having gentle undulation are formed. The asperities have inclination angles approximately in a range of 10°–20°. The patterning is performed so that the edges of the individual quadrilateral prisms will be arranged in fixed directions.

Finally, the thin-film transistors 50 for pixel electrode driving are integrated on the surface of the second substrate 2. The thin-film transistors 50 have a bottom-gate structure; each thin-film transistor 50 has a lamination structure in which gate electrodes 51 made of Mo, for example, two layers of gate insulating films 52 and 53 made of $SiO_2$, for example, and a semiconductor thin film 54 made of polysilicon, for example, are laid one on another in this order from the bottom. Each thin-film transistor 50 has a double-gate structure including the two gate electrodes 51. Channel regions are formed in the regions of the semiconductor thin film 54 that are located right above the respective gate electrodes 51. Each channel region is protected by a stopper 55 made of $SiO_2$, for example. An auxiliary capacitor 60 is formed so as to have the same layered structure as the thin-film transistor 50. The thin-film transistor 50 and the auxiliary capacitor 60 having the above structures are covered with an interlayer insulating film 59 made of $SiO_2$, for example. Contact holes that reach a source region and a drain region of the thin-film transistor 50 are formed through the interlayer insulating film 59. Interconnections 57 made of Al, for example, are formed on the interlayer insulating film 59 and connected to the source and drain regions of the thin-film transistor 50 through the contact holes, respectively. The interconnections 57 are covered with another interlayer insulating film 58. The pixel electrode 13 is patterned on the interlayer insulating film 58. The pixel electrode 13 is electrically connected to the drain region of the thin-film transistor 50 via the interconnection 57.

Figure 6:
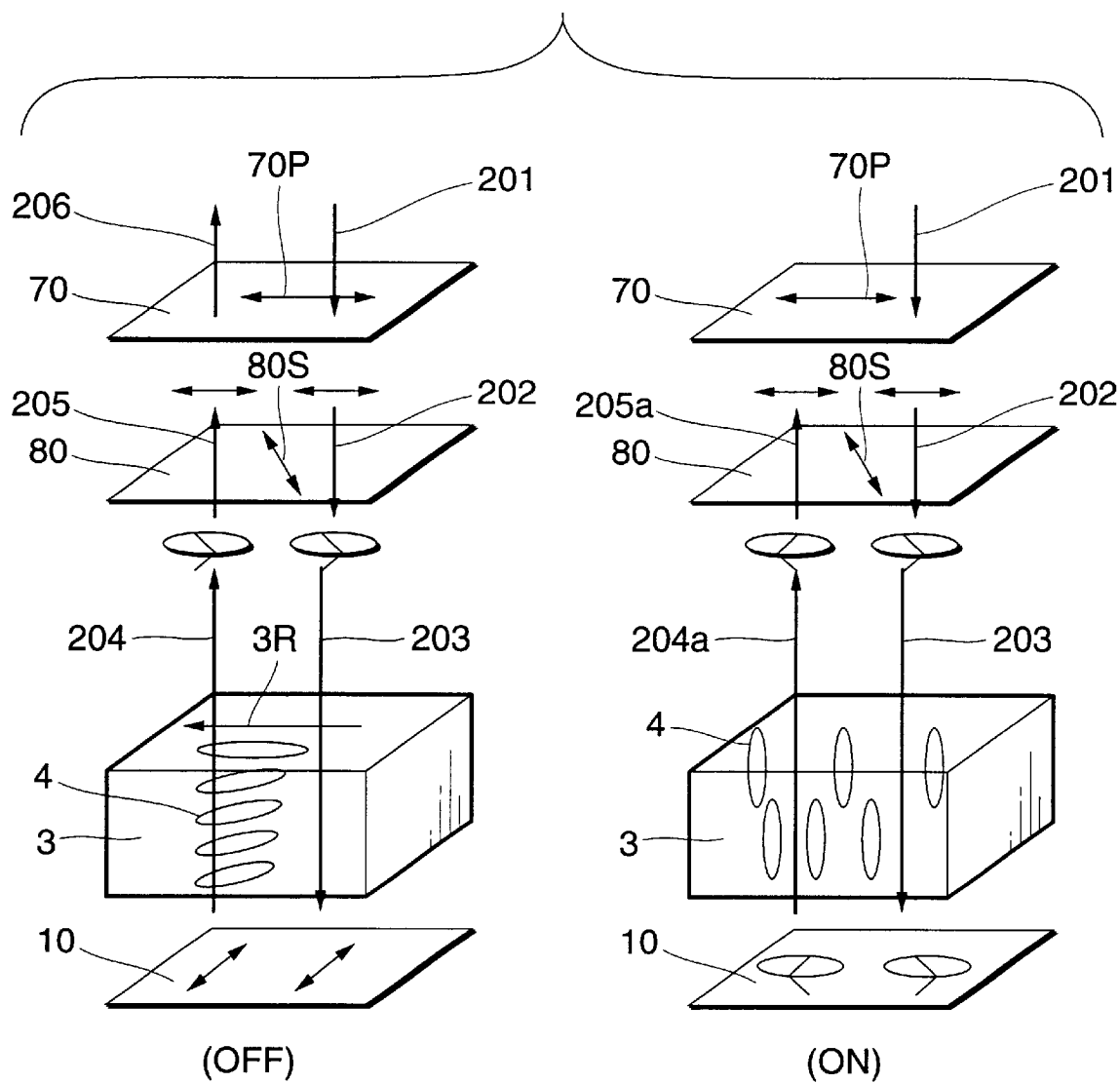
FIG. 6 illustrates the operation of the reflection-type display device of FIG. 5.

The operation of the reflection-type display device shown in FIG. 5 will be described in detail with reference to FIG. 6. In FIG. 6, (OFF) means a voltage non-application state and (ON) means a voltage application state. As shown in the (OFF) part of FIG. 6, the reflection-type display device is constructed by laying one on another the polarizing plate 70, the quarter-wave plate 80, the nematic liquid crystal layer 3, and the diffuse reflection layer 10 in this order from a viewer's side. The polarization axis (transmission axis) of the polarizing plate 70 is denoted by 70P. The optic axis 80S of the quarter-wave plate 80 forms 45° with the transmission axis 70P. The alignment direction 3R of liquid crystal molecules 4 on the side of the first substrate 1 is parallel with the polarization axis (transmission axis) 70P of the polarizing plate 70.

Incident light 201 is converted to linearly polarized light 202 when it has passed through the polarizing plate 70. The resulting polarization direction is parallel with the transmission axis 70P and this type of light will be called parallel linearly polarized light. The parallel linearly polarized light 202 is converted to circularly polarized light 203 when it has passed through the quarter-wave plate 80. The circularly polarized light 203 is converted to linearly polarized light when it has passed through the nematic liquid crystal layer 3 that functions as a quarter-wave plate. However, the polarization direction of the linearly polarized light is rotated by 90° and hence is perpendicular to the polarization direction of the parallel linearly polarized light 202. This type of light will be called perpendicular linearly polarized light. After being reflected by the diffuse reflection layer 10, the perpendicular linearly polarized light 203 passes through the nematic liquid crystal layer 3 that functions as a quarter-wave plate and is thereby converted to circularly polarized light 204. The circularly polarized light 204 passes through the quarter-wave plate 80 and is thereby converted to parallel linearly polarized light 205. The parallel linearly polarized light 205 passes through the polarizing plate 70 and is thereby converted to exit light 206, which reaches a viewer and hence effects white display.

In the voltage application state shown in the (ON) part of FIG. 6, the liquid crystal molecules 4 make a transition from a twisted alignment state to a vertical alignment state and hence loses the function of a quarter-wave plate. External light 201 is converted to parallel linearly polarized light 202 when it has passed through the polarizing plate 70. The parallel linearly polarized light 202 is converted to circularly polarized light 203 when it has passed through the quarter-wave plate 80. The circularly polarized light 203 passes through the nematic liquid crystal layer 3 without being changed in polarization state, reflected by the diffuse reflection layer 10, and then reaches the quarter-wave plate 80 as circularly polarized light 204a. The circularly polarized light 204a is converted to perpendicular linearly polarized light 205a. The perpendicular linearly polarized light 205a cannot pass through the polarizing plate 70 and hence black display is effected.

In the invention, a diffuse reflection plate is manufactured by executing the steps of forming a photosensitive resin film on a substrate; forming a collection of quadrilateral prisms that are arranged discretely by patterning the resin film by photolithography; deforming the individual quadrilateral prisms so that they will be undulated gently by performing a heat treatment; and forming a metal film on the collection of gently undulated quadrilateral prisms. By incorporating such a diffuse reflection plate in a reflection-type display device, not only the reflection luminance can be increased but also optimum designing for improvement of the visibility is enabled.

What is claimed is:

1. A diffuse reflection plate comprising:

a substrate;

a collection of gently undulated quadrilateral prisms made of a resin, formed on said substrate as slanted surfaces;

a metal film formed on the collection of quadrilateral prisms;

a curved resin film provided between the quadrilateral prisms;

a plurality of thin-film transistors integrated on the surface of said substrate, wherein each thin-film transistor further comprises:

a plurality of bottom-gate electrodes;

a plurality of layers of insulating films on top of said gate electrodes;

a semiconductor thin film on top of said insulating film layers;

a channel region formed on top of said thin film, protected by a stopper; and wherein said thin-film transistors are covered with an interlayer insulating film; and wherein said metal film formed on the collection of quadrilateral prisms is also formed on the curved resin film and acts as a pixel electrode which is driven by said thin-film transistors.

2. The diffuse reflection plate of claim 1, further comprising:

a plurality of auxiliary capacitors also integrated on the surface of said substrate and comprising the same materials as said thin-film transistors.

3. A manufacturing method for a diffuse reflection plate, comprising the steps of:

preparing a substrate;

forming a photosensitive resin film on the substrate;

forming a collection of quadrilateral prisms that are arranged discretely by patterning the resin film by photolithography;

forming a plurality of thin-film transistors integrated on the surface of said substrate, wherein each thin-film transistor further comprises:

forming a plurality of layers of insulating films on top of a plurality of bottom-gate electrodes;

forming a semiconductor thin film on top of said insulating film layers;

forming a channel region formed on top of said thin film;

protecting said channel region with a stopper; and covering said thin-film transistors with an interlayer insulating film;

gently undulating and simultaneously performing a heat treatment on the individual quadrilateral prisms thereby deforming the prisms; and forming a metal film on the collection of gently undulated quadrilateral prisms.

4. The manufacturing method according to claim 3, further comprising the step of:

applying a resin to the collection of gently undulated quadrilateral prisms, filling in flat gap portions between the discrete quadrilateral prisms, thereby forming curved surfaces between the discrete quadrilateral prisms.

5. A reflection-type display device comprising:

a transparent first substrate disposed toward a side of said device where light from an external source is incident on said device;

a second substrate bonded to the first substrate via a predetermined gap and disposed toward a side of said device where said light is reflected;

an electro-optical layer disposed in the gap in a vicinity of the first substrate;

a diffused reflection layer disposed in the gap in a vicinity of the second substrate, the diffuse reflection layer including a resin film formed with asperities and a metal film formed on a surface of the resin film, the asperities having been gently undulated by patterning a resin film into discrete quadrilateral prisms so as to leave gaps in between and then causing the quadrilateral prisms to reflow; and an electrode formed on at least one of the first and second substrates, for applying a voltage to the electro-optical layer;

a plurality of thin-film transistors integrated on the surface of said second substrate, wherein each thin-film transistor further comprises:

a plurality of bottom-gate electrodes;

a plurality of layers of insulating films on top of said gate electrodes;

a semiconductor thin film on top of said insulating film layers;

a channel region formed on top of said thin film, protected by a stopper; and wherein said thin-film transistors are covered with an interlayer insulating film; and wherein said metal film acts as a pixel electrode which is driven by said thin-film transistors.

6. The reflection-type display device according to claim 5, wherein the asperities have been gently undulated by filling in gaps remaining after reflow of the quadrilateral prisms with another resin film.

7. The reflection-type display device according to claim 5, wherein the asperities have an inclination angle of about 10° to about 20°.

8. The reflection-type display device according to claim 5, wherein the quadrilateral prisms have been patterned so that edges of the individual quadrilateral prisms are arranged in a fixed direction.

9. The reflection-type display device according to claim 5, wherein the individual quadrilateral prisms have a rectangular cross-section.

10. The reflection-type display device according to claim 5, further comprising a polarizing plate disposed in the vicinity of the first substrate, wherein the electro-optical layer being a liquid crystal layer that functions as a quarter-wave plate depending on an application state of the voltage.

11. The reflection-type display device according to claim 10, further comprising a quarter-wave plate disposed between the polarizing plate and the liquid crystal layer, wherein the liquid crystal layer is a nematic liquid crystal having positive dielectric anisotropy and aligned in a twisted manner, and functions as a quarter-wave plate when supplied with the voltage and loses a function of a quarter-wave plate when not supplied with the voltage.

12. The reflection-type display device of claim 5, further comprising:

a plurality of auxiliary capacitors also integrated on the surface of said second substrate and comprising the same materials as said thin-film transistors.

* * * * *